United States Patent
Sompalli et al.

(10) Patent No.: US 8,372,474 B2
(45) Date of Patent: Feb. 12, 2013

(54) METHOD OF MAKING FUEL CELL COMPONENTS INCLUDING A CATALYST LAYER AND A PLURALITY OF IONOMER OVERCOAT LAYERS

(75) Inventors: Bhaskar Sompalli, Rochester, NY (US); Chunxin Ji, Pennfield, NY (US); Susan G. Yan, Fairport, NY (US); Hubert A. Gasteiger, Rochester, NY (US); Hiroshi Shimoda, Tokyo (JP); Shinji Terazono, Yokohama (JP); Hirokazu Wakabayashi, Yokohama (JP); Atsuo Okawara, Yokohama (JP); Kohta Yamada, Yokohama (JP); Seigo Kotera, Yokohama (JP); Shinji Kinoshita, Yokohama (JP); Toshihiro Tanuma, Yokohama (JP)

(73) Assignee: GM Global Technology Operations LLC, Detroit, MI (US)

( * ) Notice: Subject to any disclaimer, the term of this patent is extended or adjusted under 35 U.S.C. 154(b) by 2322 days.

(21) Appl. No.: 11/374,651

(22) Filed: Mar. 13, 2006

(65) Prior Publication Data

US 2007/0213203 A1 Sep. 13, 2007

(51) Int. Cl.
*B05D 5/12* (2006.01)
*B05D 3/02* (2006.01)

(52) U.S. Cl. ............. 427/115; 427/301; 427/383.1; 427/402

(58) Field of Classification Search .......... 427/115, 427/301, 383.1, 402
See application file for complete search history.

(56) References Cited

U.S. PATENT DOCUMENTS

| 6,183,898 | B1 | 2/2001 | Koschany et al. | |
|---|---|---|---|---|
| 6,524,736 | B1 * | 2/2003 | Sompalli et al. | 429/42 |
| 6,867,159 | B2 * | 3/2005 | Ebbrell et al. | 502/101 |
| 7,291,419 | B2 * | 11/2007 | Yan et al. | 429/41 |
| 2005/0271929 | A1 * | 12/2005 | Sompalli et al. | 429/40 |
| 2006/0204831 | A1 * | 9/2006 | Yan et al. | 429/42 |
| 2008/0107945 | A1 * | 5/2008 | Coms et al. | 429/30 |

FOREIGN PATENT DOCUMENTS

WO WO 00/72391 A2 11/2000

* cited by examiner

*Primary Examiner* — Brian K Talbot
(74) *Attorney, Agent, or Firm* — BrooksGroup

(57) ABSTRACT

A process comprising: providing a substrate with a catalyst layer thereon; depositing a first ionomer overcoat layer over the catalyst layer, the first ionomer overcoat layer comprising an ionomer and a first solvent; drying the first ionomer overcoat layer to provide a first electrode ionomer overcoat layer; depositing a second ionomer overcoat layer over the first electrode ionomer overcoat layer, and wherein the second ionomer overcoat layer comprises an ionomer and a second solvent.

47 Claims, 3 Drawing Sheets

METHOD OF MAKING FUEL CELL COMPONENTS INCLUDING A CATALYST LAYER AND A PLURALITY OF IONOMER OVERCOAT LAYERS

FIELD OF THE INVENTION

The present invention relates to methods of making fuel cell components including a catalyst and a plurality of ionomer overcoat layers

BACKGROUND OF THE INVENTION

In the fuel cell art, catalysts have been coated onto polymer electrolyte membranes. The catalyst layer may be deposited directly on the membrane, or indirectly applied to the membrane by first coating the catalyst on a decal substrate. The catalysts have been coated on the decal substrate as slurry using a rolling process. The membrane with the catalyst coated thereon is known as a catalyst coated membrane (CCM).

After the catalyst is coated on the decal substrate, an ionomer may be sprayed over the catalyst before the catalyst is transferred to membrane. Even though both the catalyst and the membrane contain the ionomer, the ionomer spray layer provides a better contact between the catalyst and the membrane. This increases the proton exchange between the membrane and the catalyst, thus increasing the performance of the fuel cell.

The decal substrate may be of porous material, such as a porous expanded polytetrafluoroethylene (ePTFE) decal substrate. However, the ePTFE substrate is expensive and not reusable. Particularly, when the catalyst is transferred to the membrane on the ePTFE substrate, a certain portion of the ionomer remains in the ePTFE substrate. Further, the ePTFE substrate may stretch, deform and absorb solvents during the process, and thus the ePTFE substrate is discarded after one use.

The decal substrate can also be a non-porous material, such as an ethylene tetrafluoroethylene (ETFE) decal substrate. The ETFE decal substrate provides minimal loss of catalyst and ionomer to the substrate because virtually all of the coating and ionomer are transferred in the decal process. The ETFE decal substrates do not deform and may be reused.

In another fabrication technique, the membrane electrode assembly (MEA) is prepared as a catalyst-coated diffusion media (CCDM) instead of a CCM. The diffusion media is porous material so that gas and water may be transported through the MEA. The diffusion media is typically a carbon paper substrate that is coated with a microporous layer, wherein the microporous layer is a mixture of carbon and a fluoropolymer (FEP, PVDF, HFP, PTFE etc.). A catalyst ink is typically coated on top of the microporous layer, and may be overcoated, for example, by spraying with an ionomer solution. A piece of bare perfluorinated membrane is sandwiched between two pieces of CCDM with the catalyst sides facing the membrane and then hot-pressed to bond the CCDM to the membrane.

One approach to manufacturing robust MEAs can be found in commonly assigned U.S. Pat. No. 6,524,736 to Sompalli, et al. This approach includes a process to manufacture MEAs by coating catalyst inks on porous expanded—PTFE supports or webs to generate electrodes with a distribution of the ionomeric binder inside and on top of the electrode as shown in FIGS. 1-2a. The concept of over-spraying to aid good transfer of catalyst to the membrane is also described. Sompalli, et al., U.S. Pat. No. 6,524,736, discloses the following. The very thin microporous substrates, onto which the catalyst is deposited, may be difficult to handle, and a backing material may be bonded to the thin microporous substrates to provide a layer of strength and support. The backing material may be sufficiently bonded to the microporous substrate during the process of removing the substrate from the membrane electrode assembly. The bond must be maintained between the microporous substrate and the porous backing material throughout the entire process, and must be sustained through temperatures of the hot-pressing step.

SUMMARY OF THE INVENTION

A process comprising: providing a fuel cell substrate with a catalyst layer thereon; depositing a first ionomer overcoat layer for a first ionomer solution over the catalyst layer, the first ionomer overcoat layer comprising an ionomer and a first solvent; drying the first ionomer overcoat layer to provide a first electrode ionomer overcoat layer; depositing a second ionomer overcoat layer from a second ionomer solution over the first electrode ionomer overcoat layer, and wherein the second ionomer overcoat layer comprises an ionomer and a second solvent.

Other embodiments of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
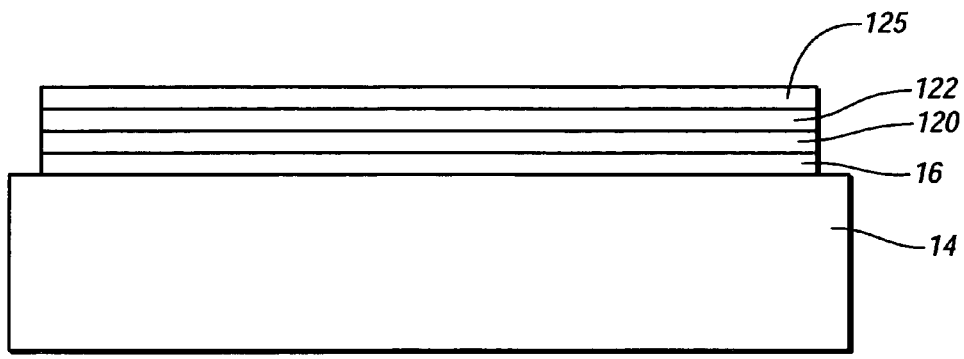
FIG. 1 illustrates one embodiment of the invention including a substrate, an overlying catalyst layer and a plurality of ionomer overcoat layers over that catalyst layer.

Referring now to FIG. 1, in one embodiment of the invention, multiple ionomer overcoat layers 120, 122, 125 are formed on or over a catalyst layer (electrode) 16. The catalyst layer 16 may be on a substrate 14 which may be any of a variety of substrates such as, but not limited to, a) a porous decal; b) a porous decal supported on a carrier film (e.g., PET), (such as disclosed in assignees application GP-308189 entitled "Method of Laminating a Decal to a Carrier Film" filed the same day herewith); c) on a non-porous decal (e.g., smooth or surface roughened ETFE films); or d) on an electrode coated on a gas diffusion media or porous micro layer.

In some embodiments of the invention, the substrate 14 may be a porous decal including, but not limited to, porous expanded PTFE, porous polypropylene, porous polyethylene and the like with or without surface coating to aid in the release of the catalyst from the decal substrate 14. Suitable porous substrates have a pore size of <1 micron, preferably <0.5 microns, and most preferably <0.25 microns and void volumes between 10 to 90%, preferably 80 to 50%. Suitable porous film thicknesses are 100 to 10 microns, preferably 20 to 75 microns. These porous films may have a suitable surface treatment such as various low surface energy coating known in the art which improve coating transfer. In other embodiments of the invention, the substrate 14 may be a non-porous material such as, but not limited to, ethylene tetrafluoroethylene (ETFE), polyethylene terephthalate, polyethylene naphthalate, or non-porous PTFE. These carrier films may have a suitable surface treatment such as sand-blasting, plasma-etching, and other methods known in the art which improve coating quality and coating transfer.

Preferably, the porous and non-porous material are capable of withstanding temperatures up to 140C for 10 minutes, preferably 160C for 10 minutes, most preferably 200C for 10 minutes. A preferred material is ePTFE in porous or non-porous form and may be 10 to 250 microns, preferably 25 to 100 microns thick. If a laminate of a porous decal supported on a carrier film is used the thickness of the porous substrate, preferably ePTFE, may be 10-25 microns. The laminate should provide strength to deposit the catalyst on the substrate 14 including a roll-coating process.

Figure 2:
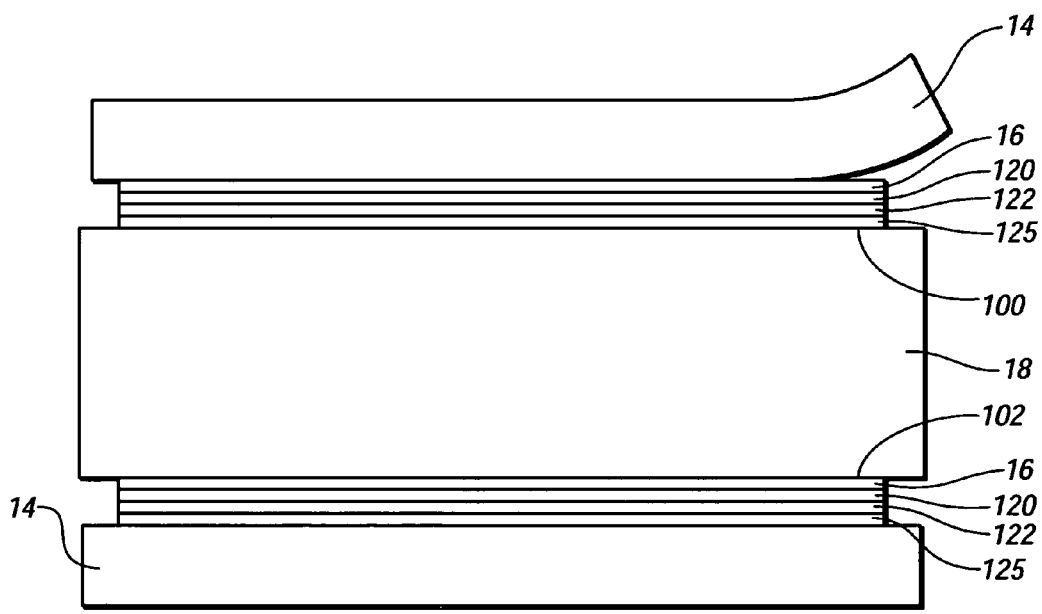
FIG. 2 illustrates a process according to one embodiment of the invention including.
Figure 3:
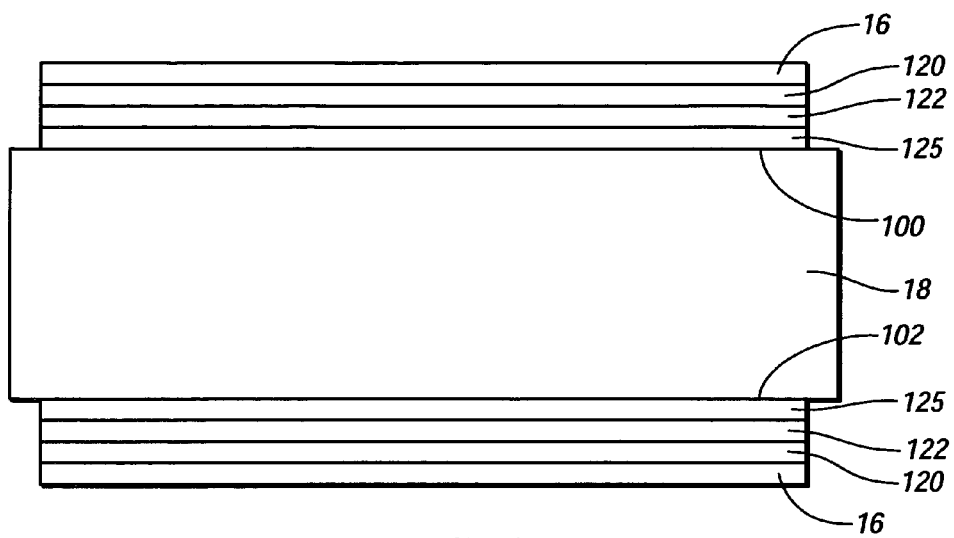
FIG. 3 illustrates a product according to one embodiment of the invention.

FIG. 2 illustrates the application of the multiple ionomer coating layers 125, 122, 120 and catalyst layer 16 on each of a first face 100 and a second face 102 of to a fuel cell membrane 18 using a decal substrate 14. The decal substrate 14 as shown in FIG. 2 may be porous, non-porous or a porous decal supported on a carrier film. FIG. 3 shows an electrode membrane assembly produced by such a process shown in FIG. 2.

Figure 4:
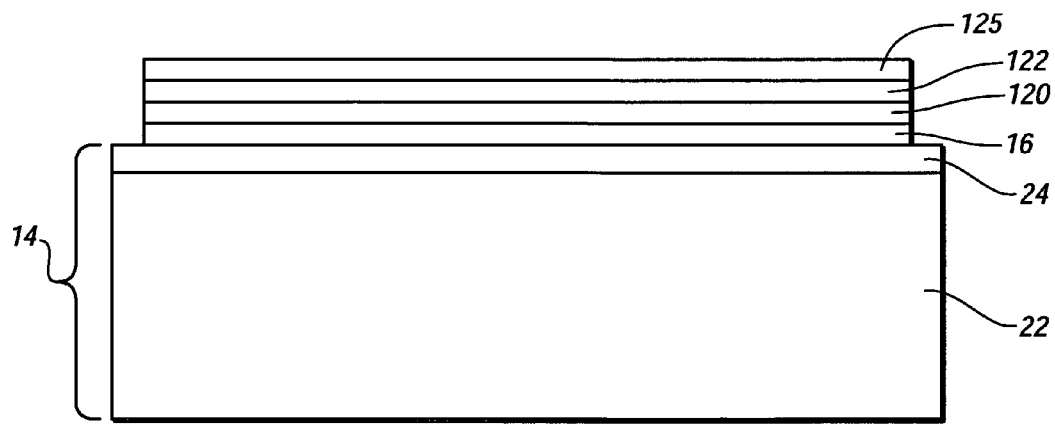
FIG. 4 illustrates a catalyst coated diffusion media including a catalyst layer over a microporous layer or a gas diffusion media material, and a plurality of ionomer overcoat layers over the catalyst layer produced according to one embodiment of the invention.

Referring now to FIG. 4, in one embodiment of the invention, the substrate 14 may be a gas diffusion media material 22 wherein the catalyst layer 16 is deposited thereon, or a gas diffusion media 22 and a microporous layer 24 on the gas diffusion media material 22 and wherein the catalyst layer 16 deposited on the microporous layer 24. Again, several ionomer overcoat layers 120, 122, 125 may be deposited on the catalyst layer 16 as will be described hereafter.

In one embodiment of the invention, a first ionomer overcoat layer 120 is deposited on the catalyst layer 16 and has a first wetting property associated with the solvents selected. The first ionomer overcoat layer 120 is allowed to dry to a first electrode overcoat layer and a second ionomer overcoat layer 122 is deposited over the first ionomer overcoat layer 120. The second ionomer overcoat layer 122 includes solvents having a second wetting property that may be the same or less than the wetting property of the first liquid ionomer overcoat layer 120. Additional ionomer overcoat layers such as a third, fourth, fifth and sixth ionomer overcoat layer may be formed in a similar manner. The ionomer overcoat layers 120, 122, 125 may be deposited by any method known to those skilled in the art including spraying, brushing, ruling, slot coating, die coating and the like.

Multiple ionomer overcoat layers with the same ionomer solution or different solution may be used. In each case, each ionomer overcoat layer is dried at room temperature or an elevated temperature using convection or IR-drying. When the term "electrode ionomer overcoat layer" is used herein, such term shall mean an ionomer overcoat layer that is completely dried to a solid material or dried only to a low viscosity material.

The solvent composition of the different subsequent ionomer overcoat layer may be chosen such that the first ionomer overcoat layer deposited on the catalyst layer has a high concentration of solvent which is highly wetting with the catalyst layer. Suitable highly wetting solvents for the liquid ionomer overcoat layers include ethanol, methanol, isopropyl alcohol, n-propyl alcohol, or higher alcohols and a low concentration of solvent which does not wet the electrode, such as, water. Subsequent ionomer overcoat layers have increasing concentrations of non-wetting solvent. In this arrangement, the wetting solvent composition introduces ionomer into the electrode, while the subsequent ionomer overcoat layers with non-wetting solvent leaves an ionomer skin on the surface of the decal which allows for improved bonding to the membrane 18.

Figure 5:
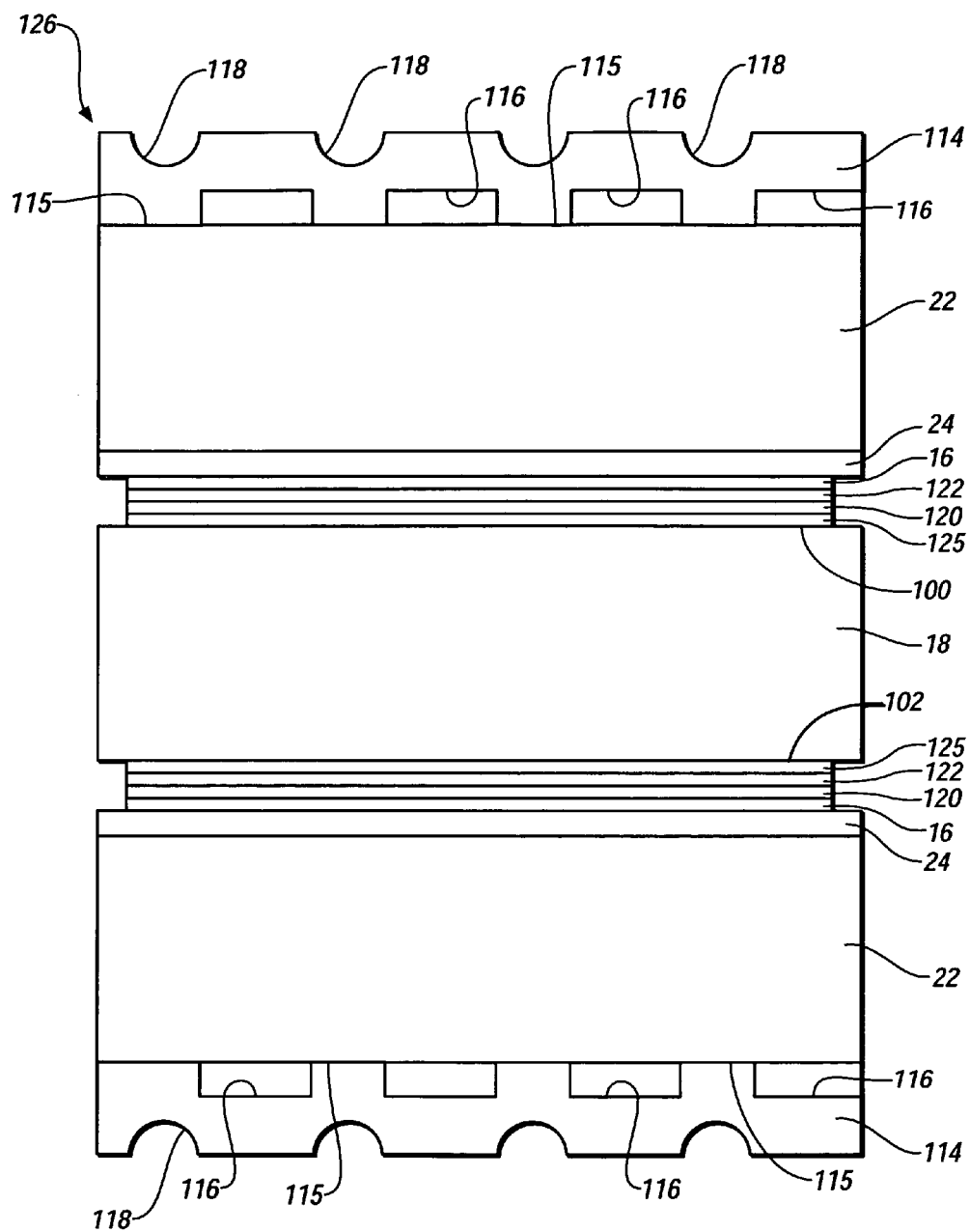
FIG. 5 illustrates a product according to one embodiment of an invention.

Referring now to FIG. 5, in another embodiment of the invention the CCM (MEA) shown in FIG. 3 or the CCDM 124 shown in FIG. 4 may be combined with other fuel cell components such as bipolar plates 114 having gas flowfield channels 116 and lands 115 in one face, and cooling channels 118 formed in another face, and wherein the bipolar plates engage the gas diffusion media material 22 to form a fuel cell assembly 126.

Solid polymer electrolyte membranes 18 useful in the present invention are ion-conductive materials. Suitable membranes useful in the present invention are described in U.S. Pat. Nos. 4,272,353 and 3,134,697, and in the Journal of Power Sources, Volume 29 (1990), pages 367-387.

Suitable membranes useful in the present invention are ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cation exchange, proton conductive resins is the so-called sulfonic acid cation exchange resin. In the sulfonic acid membranes, the cation exchange groups are sulfonic acid groups which are attached to the polymer backbone.

The formation of these ion exchange resins into membranes or sheets is well known to those skilled in the art. The preferred type is perfluorinated sulfonic acid polymer electrolyte in which the entire membrane structure has ionic exchange characteristics. These membranes are commercially available, and a typical example of a commercially sulfonic perfluorocarbon, proton conductive membrane is sold by E.I. DuPont de Nemours & Company under the trade designation Nafion. Other such membranes are available from Asahi Glass and Asahi Chemical Company. The use of other types of membrane such as, but not limited to, perfluorinated cation-exchange membranes, hydrocarbon based cation-exchange membranes as well as anion-exchange membranes are also within the scope of the invention.

The catalyst layer preferably includes a group of finely divided carbon particles supporting finely divided catalyst particles such as platinum and an ion conductive material, such as a proton conducting ionomer, intermingled with the particles. The proton conductive material may be an ionomer such as a perfluorinated sulfonic acid polymer. Preferred catalyst materials include metal such as platinum, palladium, and mixtures of metals such as platinum and molybdenum, platinum and cobalt, platinum and ruthenium, platinum and nickel, and platinum and tin, other platinum transition-metal alloys, and other fuel cell electrocatalysts known in the art.

Catalyst layer decals were coated with ionomer solutions as described herein and electrode membrane assemblies were made therefrom and the performance of the MEAs tested. The results are shown in the table below.

| example | ethanol/water overcoat#1 | dry-film thickness [μm] overcoat#1 | ethanol/water overcoat#2 | dry-film thickness [μm] overcoat#2 | $E_{cell}$ [V] at condition A | $E_{cell}$ [V] at condition B |
|---|---|---|---|---|---|---|
| #1 | 70/30 | 1.8 | none | none | 455 | 520 |
| #2 | 50/50 | 1.8 | none | none | 595 | 624 |
| #3 | 50/50 | 0.9 | 50/50 | 0.9 | 642 | 662 |
| #4 | 60/40 | 0.9 | 40/60 | 0.9 | 642 | 668 | condition A: $H_2$/air (stoichiometric flows of 2/2), 80 C cell temperature, 100/50% RH, 150 kPa, 1.5 A/cm$^2$
condition B: $H_2$/air (stoichiometric flows of 2/2), 80 C cell temperature, 50/50% RH, 175 kPa, 1.5 A/cm$^2$ As will be appreciated from the above table, the type of ionomer solvent, use of multiple overcoats and the relative wetting property of the ionomer coats has an impact on performance. It is believed that less wetting solvent (example #2) in a single coating deposits more of an ionomer film on the top of the electrode which gives better bonding and performance than using a more wetting solvent (example #1). Depositing the same dry-film thickness of ionomer via multiple overcoats (example #3) is superior to a single overcoat with the same overall dry-film thickness (example #2). Using multiple overcoats with the first using a more wetting solvent then the 2nd overcoat (example #4) is an additional means for performance improvement compared to multiple overcoats with the same solvent (example #3).

When the terms "over", "overlying", "overlies", or "under", "underlying", "underlies" are used with respect to the relative position of a first component or layer with respect to a second component or layer, such shall mean that the first component or layer is in direct contact with the second component or layer, or that additional layers or components are interposed between the first component or layer and the second component or layer.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process comprising:
   providing a substrate and coating the substrate with a surface treatment to improve catalyst layer transfer;
   applying a layer comprising a catalyst to the surface treated substrate;
   depositing a first ionomer overcoat layer over the layer comprising the catalyst, the first ionomer overcoat layer comprising an ionomer and a first solvent;
   drying the first ionomer overcoat layer to provide a first electrode ionomer overcoat layer; and
   depositing a second ionomer overcoat layer over the first electrode ionomer overcoat layer, and wherein the second ionomer overcoat layer comprises an ionomer and a second solvent.

2. A process as set forth in claim 1 further comprising depositing a second ionomer overcoat layer over the first electrode ionomer overcoat layer, and wherein the second ionomer overcoat layer comprises an ionomer and a second solvent and drying the second ionomer overcoat layer to provide a second electrode ionomer overcoat layer.

3. A process as set forth in claim 2 wherein the first solvent and second solvent are the same.

4. A method as set forth in claim 2 wherein the second solvent is less wetting than the first solvent.

5. A process as set forth in claim 2 wherein the first solvent comprises a wetting solvent, and wherein the second solvent comprises a less-wetting or non-wetting solvent.

6. A process as set forth in claim 1 wherein the first solvent comprises methanol, a $C_2$ or higher alcohol.

7. A process as set forth in claim 1 wherein the first solvent comprises at least one of methanol, ethanol, n-propyl alcohol, iso-propyl alcohol, n-butyl alcohol, sec-butyl alcohol, tert-butyl alcohol or mixtures thereof.

8. A process as set forth in claim 2 wherein the second solvent comprises at least one of water or a glycol.

9. A process as set forth in claim 2 wherein the second solvent comprises at least one of water or a glycol; and wherein the second solvent further comprises at least one of methanol, ethanol, n-propyl alcohol, iso-propyl alcohol, n-butyl alcohol, sec-butyl alcohol, tert-butyl alcohol or mixtures thereof.

10. A process as set forth in claim 2, further comprising depositing a third ionomer overcoat layer on the second electrode ionomer overcoat layer, the third ionomer overcoat layer comprising an ionomer and a third solvent.

11. A process as set forth in claim 10 wherein the third solvent is the same as the first solvent and the second solvent.

12. A process as set forth in claim 10 wherein the third solvent is less wetting than the second solvent.

13. A process as set forth in claim 10 wherein the third solvent is a non-wetting solvent.

14. A process as set forth in claim 10 wherein the third solvent comprises methanol, a $C_2$ or higher alcohol.

15. A process as set forth in claim 1 wherein the second solvent comprises methanol, $C_2$ or higher alcohol.

16. A process as set forth in claim 10 wherein the third solvent comprises at least one of methanol, ethanol, n-propyl alcohol, iso-propyl alcohol, n-butyl alcohol, sec-butyl alcohol, tert-butyl alcohol or mixtures thereof.

17. A process as set forth in claim 1 wherein the second solvent comprises at least one of methanol, ethanol, n-propyl alcohol, iso-propyl alcohol, n-butyl alcohol, sec-butyl alcohol, tert-butyl alcohol or mixtures thereof.

18. A process as set forth in claim 10 wherein the third solvent comprises at least one of water or a glycol.

19. A process as set forth in claim 10 wherein the third solvent comprises at least one of water or a glycol; and wherein the third solvent further comprises at least one of methanol, ethanol, n-propyl alcohol, iso-propyl alcohol, n-butyl alcohol, sec-butyl alcohol, tert-butyl alcohol or mixtures thereof.

20. A process as set forth in claim 10 further comprising drying the third ionomer overcoat layer to produce a third electrode ionomer overcoat layer.

21. A process as set forth in claim 20, further comprising depositing a fourth ionomer overcoat layer on the third electrode ionomer overcoat layer, the fourth ionomer overcoat layer comprising an ionomer and a fourth solvent.

22. A process as set forth in claim 20 wherein the fourth solvent is the same as the first solvent and the third solvent.

23. A process as set forth in claim 20 wherein the fourth solvent is less wetting than the third solvent.

24. A process as set forth in claim 20 wherein the fourth solvent is a non-wetting solvent.

25. A process as set forth in claim 20 wherein the fourth solvent comprises methanol, a $C_2$ or higher alcohol.

26. A process as set forth in claim 20 wherein the fourth solvent comprises at least one of methanol, ethanol, n-propyl alcohol, iso-propyl alcohol, n-butyl alcohol, sec-butyl alcohol, tert-butyl alcohol or mixtures thereof.

27. A process as set forth in claim 20 wherein the fourth solvent comprises at least one of water or a glycol.

28. A process as set forth in claim 20 wherein the fourth solvent comprises at least one of water or a glycol; and wherein the third solvent further comprises at least one of methanol, ethanol, n-propyl alcohol, iso-propyl alcohol, n-butyl alcohol, sec-butyl alcohol, tert-butyl alcohol or mixtures thereof.

29. A process as set forth in claim 20 further comprising drying the fourth ionomer overcoat layer to produce a fourth electrode ionomer overcoat layer.

30. A process as set forth in claim 1 wherein the substrate comprises a porous decal support.

31. A process as set forth in claim 1 wherein the substrate comprises a non-porous substrate.

32. A process as set forth in claim 1 wherein the substrate comprises polytetrafluoroethylene.

33. A process as set forth in claim 1 wherein the substrate comprises expanded polytetrafluoroethylene.

34. A process as set forth in claim 1 wherein the substrate comprises PET.

35. A process as set forth in claim 1 wherein the substrate comprises a gas diffusion media material and a microporous layer on the gas diffusion media layer, and wherein the ionomer overcoat layers are applied onto electrodes supported on the microporous layer.

36. A process as set forth in claim 1 wherein the substrate comprises a porous decal and a carrier film.

37. A process as set forth in claim 1 wherein the substrate comprises at least one of porous expanded PTFE, porous polypropylene, porous polyethylene, or other porous substrates.

38. A process as set forth in claim 1 wherein the substrate is porous having pores less than 1 micron.

39. A process as set forth in claim 1 wherein the substrate is porous having a void volume ranging from 10 to 90 percent.

40. A process as set forth in claim 1 wherein the substrate is porous having a thickness ranging from 10 to 100 microns.

41. A process as set forth in claim 1 wherein the substrate comprises at least one of ethylene tetrafluoroethylene, polyethylene terephthalate, polyethylene naphthalate, or non-porous PTFE.

42. A process as set forth in claim 41 wherein the substrate is surface treated to improve catalyst layer transfer.

43. A process as set forth in claim 1 further comprising surface treating the substrate comprising one of sand-blasting or plasma-etching.

44. A process comprising:
   (a) providing a substrate with a layer comprising a catalyst thereon, wherein the substrate comprises a decal;
   (b) depositing a first ionomer overcoat layer over the catalyst layer, the first ionomer overcoat layer comprising an ionomer and a first solvent;
   (c) drying the first ionomer overcoat layer to provide a first electrode ionomer overcoat layer; and
   (d) depositing a second ionomer overcoat layer over the first electrode ionomer overcoat layer, and wherein the second ionomer overcoat layer comprises an ionomer and a second solvent.

45. A process comprising:
   providing a substrate and a layer comprising a catalyst thereon;
   applying a first ionomer overcoat layer over the layer comprising the catalyst, the first ionomer overcoat layer comprising an ionomer and a first solvent, the first solvent comprising a wetting solvent;
   drying the first ionomer overcoat layer to provide a first dried ionomer overcoat layer;
   depositing a second ionomer overcoat layer over the first ionomer overcoat layer, and wherein the second ionomer overcoat layer comprises an ionomer and a second solvent, the second solvent comprising a non-wetting solvent; and
   drying the second ionomer overcoat layer to provide a second dried ionomer layer over the first dried ionomer overcoat layer.

46. A process as set forth in claim 44 wherein the substrate comprises a gas diffusion media structure.

47. A process as set forth in claim 44 wherein the substrate comprises a gas diffusion media material, and wherein ionomer overcoat layers are applied onto electrodes supported on the gas diffusion media material.

* * * * *

UNITED STATES PATENT AND TRADEMARK OFFICE
CERTIFICATE OF CORRECTION

PATENT NO.        : 8,372,474 B2  
APPLICATION NO.   : 11/374651  
DATED             : February 12, 2013  
INVENTOR(S)       : Bhaskar Sompalli et al.

Page 1 of 1

It is certified that error appears in the above-identified patent and that said Letters Patent is hereby corrected as shown below:

On the Title page: Item 73, at "Assignee", after "GM Global Technology Operations LLC, Detroit, MI (US), add the following Assignee:

-- Asahi Glass Co., Ltd., Japan --

Signed and Sealed this  
Twenty-fifth Day of February, 2014

Michelle K. Lee  
*Deputy Director of the United States Patent and Trademark Office*